United States Patent
Kuehnle et al.

(10) Patent No.: US 9,140,788 B2
(45) Date of Patent: Sep. 22, 2015

(54) ASCERTAINING AN INDICATOR FOR THE DRIVE-OVER CAPABILITY OF AN OBJECT

(71) Applicants: Goetz Kuehnle, Hemmingen (DE); Michael Schoor, Stuttgart (DE)

(72) Inventors: Goetz Kuehnle, Hemmingen (DE); Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 287 days.

(21) Appl. No.: 13/915,957

(22) Filed: Jun. 12, 2013

(65) Prior Publication Data

US 2013/0335260 A1   Dec. 19, 2013

(30) Foreign Application Priority Data

Jun. 13, 2012  (DE) .......................... 10 2012 209 870

(51) Int. Cl.
*G01S 13/34* (2006.01)
*G01S 13/93* (2006.01)
*G01S 7/41* (2006.01)
*G01S 13/46* (2006.01)

(52) U.S. Cl.
CPC ............. *G01S 13/931* (2013.01); *G01S 7/411* (2013.01); *G01S 2013/462* (2013.01); *G01S 2013/9321* (2013.01); *G01S 2013/9325* (2013.01); *G01S 2013/9375* (2013.01)

(58) Field of Classification Search
CPC ............ G01S 2013/9375; G01S 13/42; G01S 2013/462
USPC ................................ 342/70, 109, 82, 200, 123
See application file for complete search history.

(56) References Cited

U.S. PATENT DOCUMENTS 6,011,515 A * 1/2000 Radcliffe et al. ............. 342/453
7,623,061 B2 * 11/2009 Spyropulos et al. ............ 342/70

FOREIGN PATENT DOCUMENTS

| DE | 198 01 617 | 7/1999 |
| DE | 10 2005 024 716 | 12/2006 |
| DE | 10 2010 007 415 | 9/2010 |
| EP | 1 923 717 | 5/2008 |
| WO | WO 99/27384 | 6/1999 |

* cited by examiner

*Primary Examiner* — Timothy A Brainard
(74) *Attorney, Agent, or Firm* — Kenyon & Kenyon LLP

(57) ABSTRACT

In a method for ascertaining whether a target object can be driven over by the controlled motor vehicle, with the aid of frequency-modulated radar signals of a radar sensor, amplitude ratios between received radar signals reflected from the target object are utilized, the received radar signals corresponding to signals which have been transmitted in different frequency ranges. Based on the amplitude ratios, an occurrence of interference between (i) a first radar signal propagation path between the radar sensor and the target object and (ii) a second propagation path with additional reflection from a road is detected, and based on the detection of an occurrence of interference it is ascertained whether the object can be driven over.

11 Claims, 4 Drawing Sheets

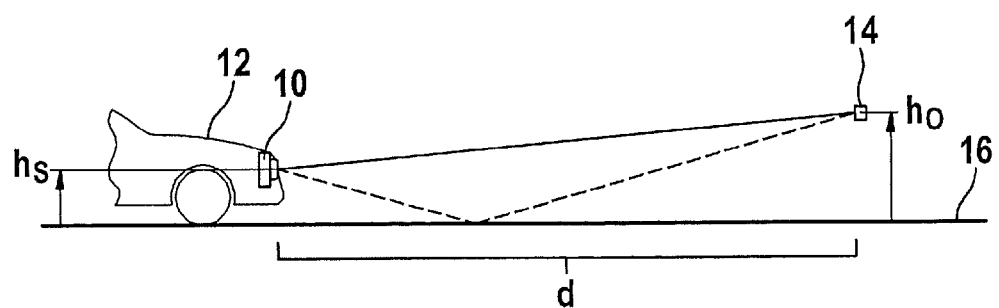
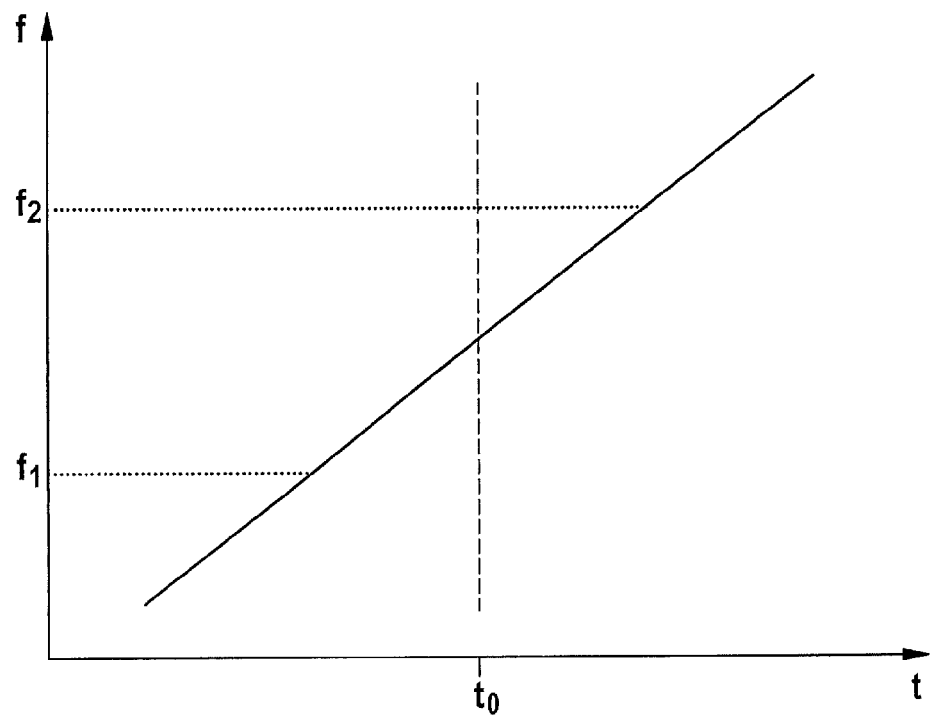
Fig. 1
Fig. 2

ASCERTAINING AN INDICATOR FOR THE DRIVE-OVER CAPABILITY OF AN OBJECT

BACKGROUND OF THE INVENTION

1. Field of the Invention

The present invention relates to a method and a device for ascertaining an indicator for the drive-over capability of an object, with the aid of frequency-modulated radar signals from a motor vehicle-mounted radar sensor.

2. Description of the Related Art

Radar sensors are used, for example, in adaptive cruise control systems (ACC systems) for motor vehicles and are used to determine the positions and relative velocities of objects, so within the scope of an adaptive speed control the velocity of the host vehicle may be adapted to the velocity of a preceding vehicle and the distance to the preceding vehicle may be set to a suitable value.

Such a radar sensor has, for example, several channels, to each of which at least one antenna element and one evaluation device are assigned. The high-frequency signals received in the various channels are mixed with a reference frequency and converted into low-frequency signals, also known as intermediate-frequency signals (IF signals). The signals are then evaluated in an electronic evaluation device. For example, the low-frequency signals are digitized with the aid of analog-to-digital converters and then further processed digitally.

Each radar object appears in a channel's frequency spectrum in the form of a peak, the position of which is dependent on the Doppler shift and thus on the relative velocity of the radar object. If the transmission frequency of the radar system is modulated, as for example in the case of a frequency-modulated continuous wave (FMCW) radar system, the position of the peaks is also dependent on the travel time of the radar signals. If in one measuring cycle the transmitted signal has different suitably selected frequency ramps, the relative velocity of the object and the distance to the object may be calculated from the frequencies of the peaks obtained.

Published German patent application document DE 10 2005 024 716 A1 describes a method and a device for detecting and classifying objects, in which the signals received by a radar sensor are evaluated using a comparison with stored characteristic values and the class of the reflecting object is inferred based on the evaluation. One property that may be incorporated in these classes is whether objects are traversable (for example a manhole cover that can be driven over, a beverage can that can be driven over, a road bridge that can be driven under) or are not traversable and cannot be driven over (for example automobiles, trucks, bicycles or motorcycles, guard rails, street signs). A comparison with characteristic patterns takes place, for example by evaluating the spectrum of an object reflection's reflected power, in particular an envelope of the spectrum, and a phase angle.

Published German patent application document DE 10 2010 007 415 A1 describes a radar signal processing method for estimating the height of an object above a reflecting surface, in which a change over time of a distance to the object is determined by a radar system and an intensity modulation of a received signal is ascertained. The method is based on the radar wave interference occurring as a result of reflection from a road surface. The interference patterns, as the vehicle approaches an object, result in intensity modulation in the form of an oscillating backscatter amplitude of the radar signal. The height of the object above the reflecting surface is deduced from the progression of the intensity modulation over a reciprocal distance to the object and/or over the quotient created from a radar height and the distance to the object.

BRIEF SUMMARY OF THE INVENTION

For driver assistance systems, in particular driving safety systems, which are capable of initiating automatic emergency braking when they detect an object, it is desirable if, as the vehicle approaches an object, the detected object may be classified reliably and as early as possible. This may help to avoid erroneous triggering of automatic emergency braking and overall increases the usefulness of the driver assistance system.

A particularly important characteristic for classifying a detected object is whether the object can be driven over or not. However, direct evaluation of a reflected radar signal to determine the height of an object, for example with the aid of angle estimation in the direction of elevation, places very heavy demands on the radar sensor's angle resolution in the direction of elevation.

The purpose of the present invention is to provide a new indicator, which may support or improve a classification of a detected radar object.

A contribution for achieving this objective is made according to the present invention by a method of the type described at the outset, in which, on the basis of amplitude ratios between received radar signals reflected from an object, following transmission in differing frequency ranges, an occurrence of interference between a first radar signal propagation path between a radar sensor and the object and a second propagation path with additional reflection from a road is detected, an indicator for the drive-over capability of an object being ascertained based on the detection of an occurrence of interference. It is preferable if the amplitude ratio corresponds to a quotient of the amplitudes. The amplitude ratios may be provided, for example, through establishing a quotient of the amplitudes or, as logarithmic amplitude ratios, by subtraction of the logarithmic amplitudes. In place of establishment of a quotient, however, an amplitude ratio may also be provided in the form of a result of a comparison of the amplitudes.

For example, the first propagation path may be a direct propagation path between the radar sensor and the object, and in the second propagation path an additional reflection may occur on the outward travel of a radar signal from the radar sensor to the object and/or on the return travel of the reflected radar signal from the object to the radar sensor.

In particular, destructive interference between the radar signals running through the different propagation paths may result in a significant reduction of the amplitude of the received signal. For example, an occurrence of interference is detected from an occurrence of interference of differing levels of intensity in the different frequency ranges of the transmitted radar signals. If, for example, destructive interference occurs between the different propagation paths principally in one of the different frequency ranges of the radar signals, while the condition for destructive interference for any other frequency range of a radar signal is not met, then with otherwise essentially the same characteristics of the signal transmission path radar sensor-object-radar sensor the amplitudes of the relevant received signals may differ widely from one another. However, in situations of no interference between the different propagation paths, the radar signals transmitted in different frequency ranges and at close time intervals are subject to essentially the same influences, with the result that the amplitudes of the received signals barely differ from one another. The amplitude ratio between the received signals assigned to the transmitted signals emitted in different frequency ranges is thus largely free of other factors influencing the signal amplitude and is therefore particularly suitable for selectively inferring whether or not an interference situation is present.

With a target object at a given height above the road and at a given height of the radar sensor, destructive interference occurs at certain distances d between the radar sensor and the object, while in distance ranges between these distances d the condition for destructive interference is not met for any of the radar signals.

For example, the occurrence of the interference may be detected on the basis of the ascertained progression of the amplitude ratios between the received radar signals reflected from the object, having been transmitted in different frequency ranges, for a range of the distance between the radar sensor and the object. The range of the distance may, for example, be selected in such a way that at a typical height of an object to be detected the occurrence of the interference in the range of the distance is to be anticipated.

For example, an indicator for the drive-over capability of an object may be ascertained based on the detection of the occurrence of interference, the indicator taking on a first value which assesses or classifies the object as one that can be driven over if no occurrence of the interference is detected, and taking on a different value if the occurrence of interference is detected. The indicator may, for example, assess or classify an object as one that cannot or potentially cannot be driven over.

For example, information about the height of the object may be determined based on the detection of an occurrence of interference and based on at least one value of the distance between the radar sensor and the object at which interference, in particular destructive interference, occurs. The height information forms in particular an indicator for the drive-over capability of a particular object. Thus, for example, an estimated object height may be ascertained. Here an object height which is below a threshold value may cause the object to be assessed or classified as being one that can be driven over.

Moreover, a contribution for achieving the stated objective may be made according to the present invention by a device for ascertaining an indicator for the drive-over capability of an object with the aid of frequency-modulated radar signals from a motor vehicle-mounted radar sensor, the device having:
- a unit for determining amplitude ratios between radar signals reflected from an object and received by the radar sensor, having been transmitted by a radar sensor in different frequency ranges,
- a detection unit for detecting an occurrence of interference between a direct propagation path of radar signals between the radar sensor and the object and an indirect propagation path with additional reflection from a road, on the basis of the determined amplitude ratios, and
- an assessment unit which is equipped to ascertain an indicator for the drive-over capability of an object, on the basis of the detection by the detection unit of an occurrence of interference.

BRIEF DESCRIPTION OF THE DRAWINGS

FIG. 1 shows a schematic representation of propagation paths of radar signals between a vehicle's radar sensor and an object.

FIG. 2 shows a schematic representation of the frequency progression of a frequency modulation of transmitted radar signals.

DETAILED DESCRIPTION OF THE INVENTION

FIG. 1 shows a situation in which a radar sensor 10, which is mounted in a vehicle 12, may detect and identify an object 14. Radar sensor 10 is installed at a height $h_s$ above a road 16. Object 14 is at a height $h_o$ above road 16.

A solid line shows a first, direct propagation path of radar signals from radar sensor 10 to object 14 and back to radar sensor 10. A broken line shows a second, indirect propagation path, in which an additional reflection from road 16 occurs both on the outward travel from radar sensor 10 to object 14 and on the return travel back to radar sensor 10. Further possible radar signal propagation paths or transmission paths may result from a situation in which a radar signal takes different propagation paths on the outward travel and on the return travel, so that the propagation path as a whole precisely covers a reflection from road 16.

The occurrence of destructive interference between different transmission paths of the radar signals, with an object 14 at a given height and a given sensor height h, is dependent on the frequencies of the radar signals and on distance d, in other words the distance of object 14 from radar sensor 10 in a direction parallel to road 16.

In general, the condition for destructive interference is dependent to a sensitive degree on the frequency of the radar signals. Thus, with otherwise unchanged parameters the conditions for destructive interference may be eliminated as a result of a phenomenon as small as a frequency change of the transmitted radar signal, of an order of magnitude such as occurs with a typical frequency modulation ramp of an FMCW radar sensor.

FIG. 2 shows an example of a frequency modulation ramp of an FMCW radar signal of radar sensor 10, with the frequency ramp having a linearly increasing frequency. The frequency is, for example, increased via a frequency shift of 1 GHz, from 76.25 GHz to 77.25 GHz.

Detection of the occurrence of interference between the different propagation paths is based on an evaluation described in greater detail below, in which the received signals of the radar signals transmitted in different frequency ranges become related to each other. Here, the progression over time of the received signal is initially split into two parts, which are evaluated separately.

FIG. 2 shows at the frequency modulation ramp a subdivision over time into a first radar signal where $t<t_0$ and a second radar signal where $t≥t_0$. The first and second radar signals correspond respectively to frequency modulation ramps with mid-frequencies $f_1$ and $f_2$. The mid-frequencies differ from one another in the example described by 500 MHz, with $f_1$=76.5 GHz and $f_2$=77.0 GHz.

The radar signals corresponding to the respective partial ramps are transmitted one immediately after the other, so that the transmission situation and in particular the propagation paths for the two radar signals are virtually identical.

Figure 3:
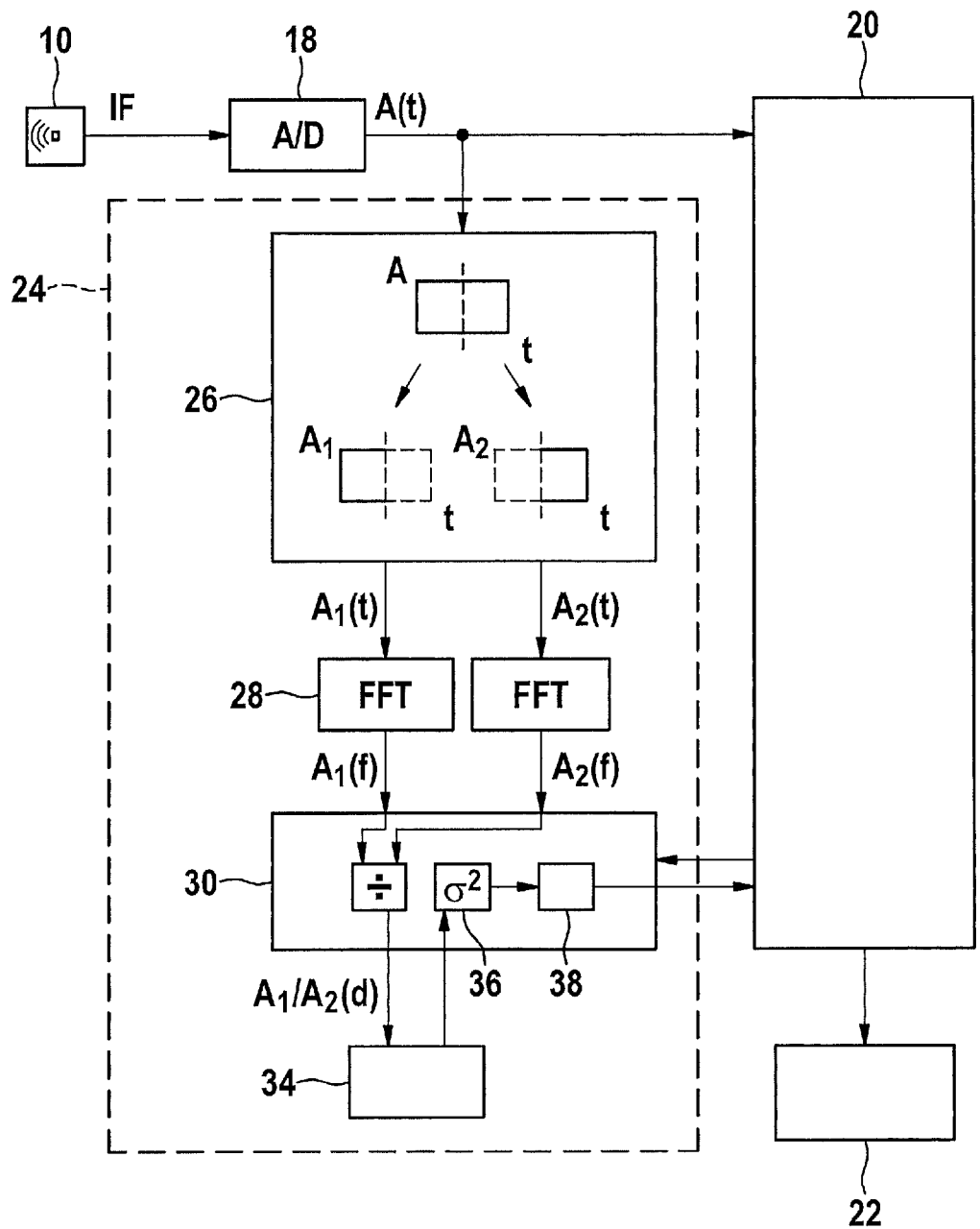
FIG. 3 shows a schematic block diagram of a motor vehicle's radar system.

FIG. 3 shows a schematic layout of a radar system for motor vehicles. The system includes a device for ascertaining an indicator for the drive-over capability of an object. This device and also a method for ascertaining an indicator for the drive-over capability of an object are described in greater detail below.

The system includes radar sensor 10, which may, for example, be a multichannel radar sensor. Radar sensor 10 has one or multiple antenna elements for transmitting and/or receiving radar signals. In the following text for purposes of simplifying the description only one channel is considered. Radar sensor 10 is designed in a manner known per se to transmit frequency-modulated radar signals and to receive radar signals reflected from an object 14. For example, it may be an FMCW radar sensor, in which the frequency of a transmitted radar signal is periodically modulated, in particular in the form of at least one frequency ramp per measuring cycle. In one channel of the radar sensor a received radar signal is mixed with the transmitted radar signal and thus converted into an intermediate-frequency (IF) signal. The IF signal is digitized by an analog-to-digital converter 18, and the digitized intermediate-frequency signal is supplied in the form of the amplitude progression A(t) to an evaluation unit 20, which in a manner known per se determines and evaluates the frequency spectra of the received signals of the ramps of each measuring cycle by Fourier transform, in particular an FFT (fast Fourier transform). For example, relative velocities v and distances d of potential radar objects are ascertained on the basis of the position of peaks in the frequency spectra, and an object identification is carried out. For example, a peak in a frequency spectrum may be assigned to a detected object. Furthermore, evaluation unit 20, for example, carries out object tracking by taking into account the progression over time of the frequency spectra over several measuring cycles of radar sensor 10.

When evaluation unit 20 has detected an object, it activates a driver assistance system 22, for example a driving safety system and/or an ACC system. Driver assistance system 22 is in particular designed to intervene in the drive train and/or the braking system of vehicle 12. For example, driver assistance system 22 may be designed to automatically initiate emergency braking, if detection of an object indicates a hazardous situation with an immediately impending collision with an object 14 ahead of vehicle 12. For this purpose, evaluation unit 20 is, for example, designed to classify a detected object 14 ahead of vehicle 12 with regard to its drive-over capability and to make use of the classification of a detected object in the assessment of the risk of collision.

The system shown in FIG. 3 also includes a second evaluation unit in the form of a device 24 for ascertaining an indicator for the drive-over capability of an object.

In accordance with the division, shown in FIG. 2, of a modulation ramp into chronologically following first and second radar signals at the mid-frequencies $f_1$ and $f_2$, a division of the progression over time of the digitized intermediate-frequency signal A(t) initially takes place into first and second intermediate-frequency signals, which are assigned respectively to the first and second radar signals. The first intermediate-frequency signal thus corresponds to the received signal for the first radar signal, and the second intermediate-frequency signal thus essentially corresponds to a received signal for the second radar signal. The intermediate-frequency signals are, for example, multiplied with a window, such as a Kaiser window or a Chebyshev window, and by zero-padding, for example, are padded to a data set length corresponding to the original intermediate-frequency signal A(t).

The intermediate-frequency signals $A_1(t)$ and $A_2(t)$ thus provided by unit 26 are each subjected to a fast Fourier transform with the aid of an FFT unit 28. The frequency spectra $A_1(f)$ and $A_2(f)$ provided by FFT units 28 are then further processed by a processing unit 30. Processing unit 30 includes a unit 32 for determining amplitude ratios and is linked with a memory 34 for storing a distance-dependent progression of the amplitude ratios. In addition, processing unit 30 includes a detection unit 36 for detecting an occurrence of interference and also an assessment unit 38, which is designed to ascertain an indicator for the drive-over capability of an object on the basis of an occurrence of interference detected by detection unit 36.

Unit 32 determines for an object 14 detected by radar sensor 10 the signal amplitude $A_1$ and $A_2$ of the peaks assigned to object 14 in the frequency spectra $A_1(f)$ and $A_2(f)$. In this process, unit 32 accesses, for example, information on the object which is provided by evaluation unit 20. That information may, for example, include assignment information, which assigns a peak in the frequency spectrum in question to object 14. In addition, the object information includes distance d to the object. If the data set lengths of the intermediate-frequency signals are identical to the data set length of the corresponding intermediate-frequency signals evaluated by evaluation unit 20, the result is a particularly simple assignment of the object information of evaluation unit 20 obtained from the frequency spectrum to the frequency spectra $A_1(f)$ and $A_2(f)$.

The amplitude ratio assigned to a detected object 14, provided by unit 32, in the form of the amplitude quotient $A_1/A_2$ or the difference in the logarithmic amplitudes, is stored in memory 34 for the object distance d in question. This means that as the vehicle approaches object 14 a distance-dependent progression of the amplitude ratio is obtained. The progression is determined, for example, for a range of distance d, and in particular for discrete values of distance d within the range.

Figure 4:
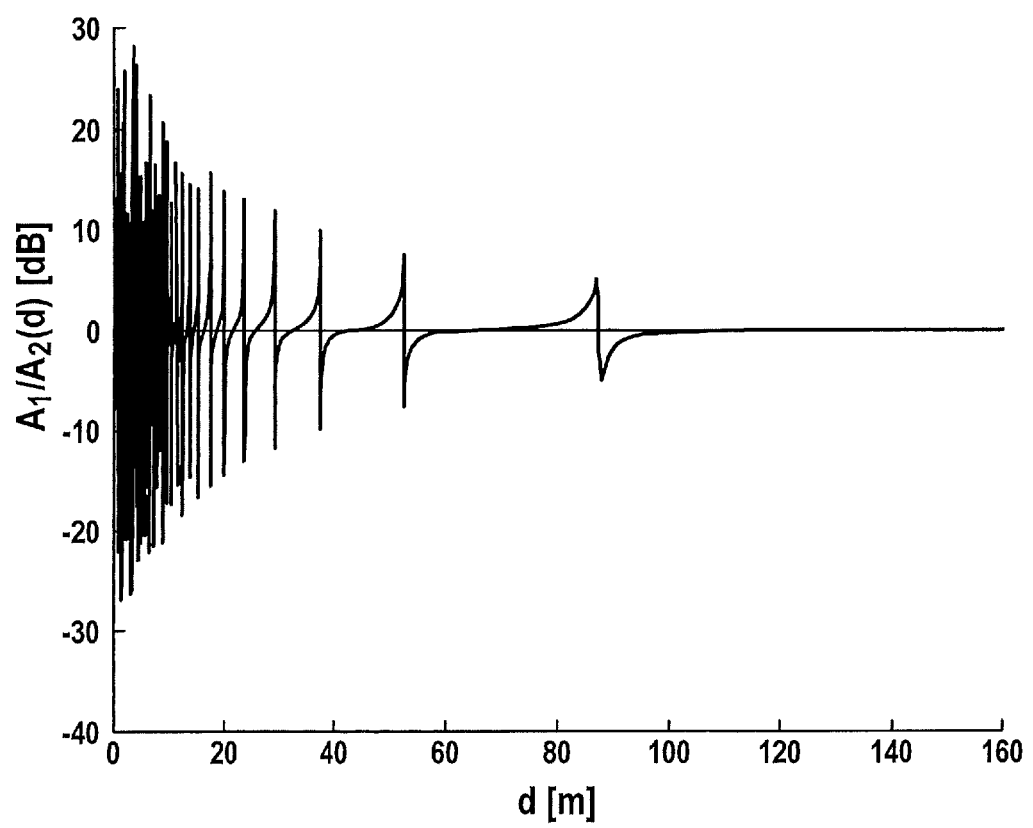
FIG. 4 shows a theoretical progression of the amplitude ratio of received signals as a function of the distance to the object.

FIG. 4 shows, as an example, for a theoretical model situation, the distance-dependent progression of the amplitude ratio in dB over distance d in meters. In this process, a sensor height $h_s$ of 0.35 m and an object height $h_O$ of 0.8 m were assumed, and radar signals were computed in accordance with the example shown in FIG. 2.

The points of destructive interference, occurring at ever shorter intervals as distance d decreases, are clearly apparent. When mid-frequency $f_1$ of the first radar signal meets the condition for destructive interference, the value of amplitude $A_1$ is very low, while at the same time the value of amplitude $A_2$ of the received signal received by the radar signal with mid-frequency $f_2$ is hardly affected by destructive interference. A very low amplitude ratio results. If distance d is slightly changed, however, the radar signal with mid-frequency $f_2$ meets the condition for destructive interference, while the first radar signal is barely affected any longer, so that a very high amplitude ratio results. The interference pattern with closely sequential positive and negative excursions of the logarithmic amplitude ratio repeats in a similar way at distances d at which the condition for interference is met, while in the distance ranges in between the amplitude ratio is virtually equal to one, i.e., 0 dB.

In the example in FIG. 3 detection unit 36 is designed to detect the occurrence of destructive interference on the basis of the progression of amplitude ratios $A_1/A_2$ obtained for a range of distance d.

Detection of destructive interference occurs, for example, by evaluating the progression of the amplitude ratios stored in memory 34 with the aid of a sliding window, the variance of the logarithmic amplitude ratio being computed for the respective progression of the amplitude values within the sliding window. This offers a measure for the deviation of the logarithmic amplitude ratio from the mean value zero, i.e., from the value expected in the absence of destructive interference. Detection unit 36 then detects, for example, the presence of destructive interference if the variance exceeds a predefined threshold value. The threshold value may, for example, be distance-dependent.

Assessment unit 38 is set up to ascertain an indicator for the drive-over capability of object 14 on the basis of detection of an occurrence of interference by detection unit 36, the indicator being provided to evaluation unit 20, so that a classification of the object may take place taking into account the indicator for the drive-over capability of an object.

Assessment unit 38 is, for example, set up to ascertain on the basis of the detection of an occurrence of interference and on the basis of at least one additional parameter characterizing signal transmission quality of the propagation path between radar sensor 10 and object 14. For example, distance d may be used as the additional parameter, with the distance-dependent variance of the logarithmic amplitude ratio determined by detection unit 36 being weighted as a factor of the distance. For example, a distance-dependent weighting of the amplitude ratios may take place for taking into account the path attenuation increasing as the distance increases, in other words the attenuation of the radar signal along the travel path covered. In a corresponding manner, a weighting of the amplitude ratio may also take place, by taking into account the signal-to-noise ratio (SNR) or the radar-cross section (RCS) of object 14, since these characteristics decrease with increasing distance d from object 14 and the significance of the values of the amplitude ratios decreases with increasing distance d due to a deteriorating signal quality. A weighting may in addition be adapted to the anticipated distance-dependent progression of the amplitude ratio. For example, above an upper distance limit a reduced weighting may take place, since depending on the object height no situations of destructive interference are to be expected in ranges of longer distances.

Assessment unit 38 is, for example, set up to ascertain an indicator for the drive-over capability of an object, which has a first state if an occurrence of destructive interference is detected, and has a second state if for a predefined range of distance d a non-occurrence of destructive interference is detected. The second state may, for example, assess the drive-over capability of the object in question as valid or given and thus support a classification of the object as drive-over capable. The first state may, for example, assess the drive-over capability of the object in question as potentially invalid, if, for example, the occurrence of destructive interference indicates that the drive-over non-capability of an object may not be excluded. This information may also support a classification of the object. The ascertained indicator provides relevant information for an object, namely information about the drive-over capability of an object.

Evaluation unit 20 and device 24 may, for example, be implemented in the form of program units in a data processing unit.

Figure 5:
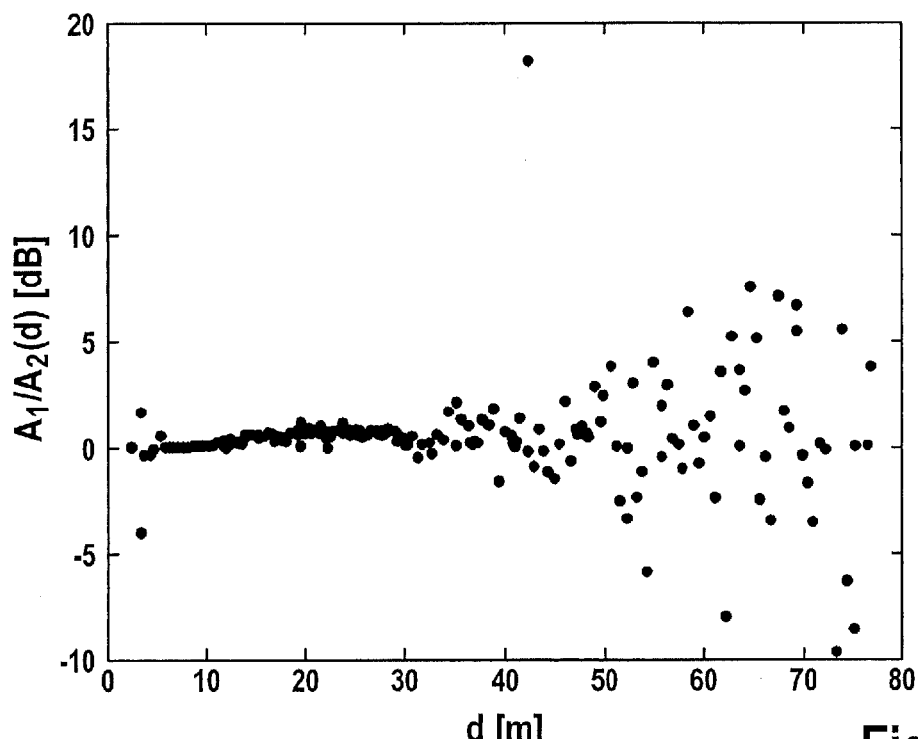
FIG. 5 shows a schematic representation of a measured distance-dependent progression of the amplitude ratio of received radar signals, reflected directly from an object at road level.
Figure 6:
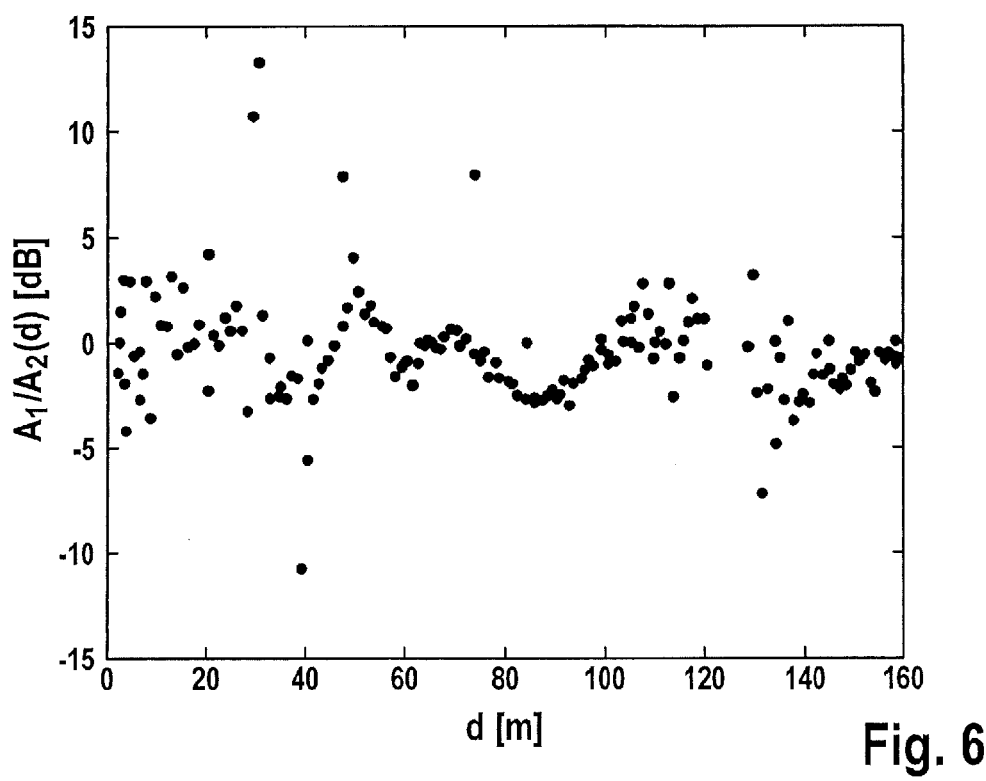
FIG. 6 shows a schematic representation of a measured distance-dependent progression of an amplitude ratio of received radar signals, reflected from an object that cannot be driven over.

FIG. 5 and FIG. 6 show as examples real measurements of a distance-dependent progression of the amplitude ratios of the amplitudes assigned to an object 14 from measurements with the aid of a frequency modulation ramp divided into two sub-ramps similar to the example shown in FIG. 2, the sub-ramps being evaluated as first and second radar signals in the manner described above. For object 14 a reference object was used, approximately corresponding to an ideal point target. FIG. 5 shows the amplitude ratios in the case of an object 14 lying on road 16, corresponding to an object height that is approximately zero. FIG. 6 shows the amplitude ratios with the reference object at a height $h_o$ of 80 cm.

While in the case of the object lying on the ground in FIG. 5 at greater distances (d>40 m) a wide spreading of the amplitude ratios is evident, due to noise, in the distance range between 10 m and 30 m a smooth progression of the amplitude ratios at approximately 0 dB is apparent. The non-occurrence of destructive interference thus allows an evaluation of the object as one that can be driven over.

In FIG. 6 it is clearly apparent that in the same distance range of 10 m to 30 m a wide variance of the amplitude ratios occurs, so that, particularly under consideration of a high signal-to-noise ratio, object 14 may be evaluated as one that potentially cannot be driven over.

A more extensive evaluation of the progression of the amplitude ratios may take place, in that values of distance d are ascertained at which an occurrence of destructive interference is detected, and the object height $h_o$ is estimated on the basis of the ascertained values of distance d. Distances d at which destructive interference occurs are dependent on the sensor height and the object height. In particular, destructive interference occurs for approximately those values of d for which the following is valid:

$$n\pi \cong \frac{2\pi}{\alpha} h_O h_S \frac{1}{d} \qquad (1)$$

where n is a natural number and $\lambda$ is the wavelength of the radar signal. In other words, destructive interference occurs when the right-hand side of equation (1) is a multiple of $\pi$. The wavelength is here assumed in a simplified manner to be $2c/(f_1+f_2)$, with c being the speed of light, and the value of d at which interference occurs being assumed as the mid-point between a positive spike and a corresponding negative spike, in the example in FIG. 4. By taking into account sensor height $h_s$ it is thus possible to infer object height $h_0$ from the values $1/d$ at which destructive interference occurs. Depending on the accuracy of the determination of the values $1/d$ only a few values may be needed for an evaluation.

The ascertainment of the object height may take place in the form of an ascertainment of an object height range from several height ranges, the height ranges including, for example, at least one corresponding to a vehicle height and at least one corresponding to an object that can be driven over. The object height may, for example, be estimated with the aid of a pattern comparison in which a pattern of ranges of the values of d at which interference occurs is compared with patterns assigned to the respective object height ranges. In this way, information concerning the height of object 14 may be determined from value locating ranges of d within which interference occurs. If, for example, measured values of distances d at which destructive interference occurs lie in ranges around such distances d at which in accordance with the example in FIG. 4 destructive interference is anticipated, then an object height range may be inferred which in particular includes the value $h_o=80$ cm.

The ascertainment of the object height may also take place by ascertaining the constant repeat rate in accordance with equation (1) of the sequential values of $h_s/d$ at which destructive interference occurs, this repeat rate being approximately equal to $\lambda/(2h_s)$.

The device and method described above may be integral parts of a device or method, respectively, for detecting and classifying objects.

While an exemplary description was given above of the ascertainment of an indicator for the drive-over capability of an object based on measurements with the aid of one frequency modulation ramp as shown in FIG. 2, it is also conceivable for the detection of the occurrence of interference for radar signals to be carried out with the aid of several frequency modulation ramps in a measuring cycle of radar sensor 10.

In the described exemplary embodiment, an indicator for the drive-over capability of an object is ascertained without additional measurements being needed for this purpose. Rather, the measurements which in any event are evaluated by evaluation unit 20 may be subjected to an additional evaluation by device 24. In the example described above, the radar signals transmitted in different frequency ranges are part of a more comprehensive radar signal, which is frequency-modulated with the aid of one frequency ramp. The individual radar signals are chronologically successive parts of the more comprehensive radar signal. In particular, the individual radar signals correspond to ramp segments of the frequency-modulation ramp of the more comprehensive radar signal.

As a variant on this example, radar signals that correspond to separate frequency-modulation ramps may also be used, for example at least two radar signals with different mid-frequencies that are each frequency-modulated with one frequency ramp. The radar signals should preferably follow one another chronologically immediately or only a small distance apart, so that the transmission situation between the radar signals changes as little as possible.

While in the examples described above a radar signal split into two sub-signals is evaluated separately, or two separate radar signals are evaluated, it is also conceivable to make use of more than two radar signals to ascertain the indicator for the drive-over capability of an object. The amplitude ratios between the combinations of the different radar signals may be ascertained and evaluated, the frequency ramp of a radar signal being subdivided into three time segments, for example amplitude ratios $A_1/A_2$, $A_1/A_3$ and $A_2/A_3$.

What is claimed is:

1. A method for ascertaining a capability of a controlled vehicle to drive over a target object, the method comprising:
    transmitting multiple frequency-modulated radar signals in different frequency ranges from a radar sensor of the controlled vehicle;
    determining amplitude ratios between received radar signals reflected from the target object, the received radar signals corresponding to the radar signals transmitted in different frequency ranges;
    detecting, based on the determined amplitude ratios, an occurrence of interference between (i) a first radar signal propagation path between the radar sensor and the target object, and (ii) a second, indirect propagation path between the radar sensor and the target object, the second propagation path including an additional reflection from a road; and
    ascertaining, based on the detection of the occurrence of interference, an indicator for the capability of the controlled vehicle to drive over the target object.

2. The method as recited in claim 1, wherein an occurrence of destructive interference between the first propagation path and the second propagation path is detected.

3. The method as recited in claim 2, wherein the occurrence of interference between the first and second propagation paths is detected based on a progression of amplitude ratios ascertained for a range of distances between the radar sensor and the object.

4. The method as recited in claim 1, wherein the radar signals transmitted in different frequency ranges are each frequency-modulated with the aid of a respective frequency ramp, the mid-frequencies of the frequency ramps being different.

5. The method as recited in claim 4, wherein the different frequency ranges in which the radar signals are transmitted do not overlap.

6. The method as recited in claim 5, wherein the radar signals transmitted in the different frequency ranges are component radar signals of a comprehensive radar signal, and wherein the comprehensive radar signal is modulated with the aid of a frequency ramp extending over the chronological progression of the individual component radar signals.

7. The method as recited in claim 4, wherein the occurrence of interference is detected based on a degree of deviations of the amplitude ratios relative to a mean value over a range of distances between the radar sensor and the target object.

8. The method as recited in claim 4, wherein in the step of ascertaining the indicator for the capability of the controlled vehicle to drive over the target object, the indicator has at least one first state if the occurrence of the interference is detected, and a second state if a non-occurrence of the interference is detected.

9. The method as recited in claim 4, wherein information regarding a height of the target object is ascertained based on (i) the detection of an occurrence of interference and (ii) at least one value of the distance between the radar sensor and the target object at which the interference occurs.

10. The method as recited in claim 4, wherein the indicator for the capability of the controlled vehicle to drive over the target object is ascertained based on the detection of an occurrence of interference and at least one of (i) a value of the distance between the radar sensor and the target object, and (ii) at least one parameter characterizing a signal transmission quality of the propagation path between the radar sensor and the target object.

11. A device for ascertaining an indicator for a capability of a controlled vehicle to drive over a target object, comprising:
    a radar sensor transmitting multiple frequency-modulated radar signals in different frequency ranges;
    a unit for determining amplitude ratios between the multiple radar signals reflected from the target object and received by the radar sensor;
    a detection unit configured to detect, based on the determined amplitude ratios, an occurrence of interference between (i) a first, direct propagation path for the radar signal between the radar sensor and the target object, and (ii) a second, indirect propagation path for the radar signal between the radar sensor and the target object, the second propagation path including an additional reflection from a road; and
    an assessment unit configured to ascertain, based on the detection of an occurrence of interference by the detection unit, the indicator for the capability of the controlled vehicle to drive over the target object.

* * * * *